Feb. 17, 1970     J. A. POPE ET AL     3,495,686
IMPULSE PUMP
Filed Aug. 31, 1967
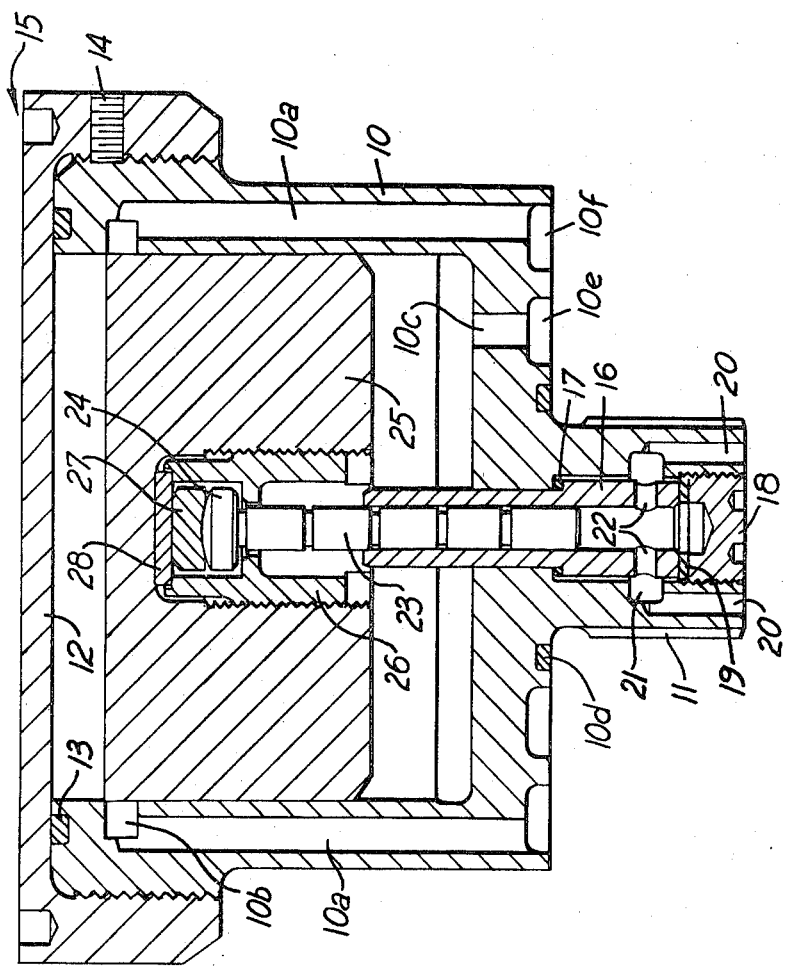
INVENTORS
J.A. POPE & J.E.H. APPLEBY
BY
BIERMAN & BIERMAN Esqs

United States Patent Office 3,495,686
Patented Feb. 17, 1970

3,495,686
IMPULSE PUMP
Joseph Albert Pope, Bramhall, and John Edwin Herbert Appleby, Cheadle, England, assignors to Mirrlees National Limited, a British company
Filed Aug. 31, 1967, Ser. No. 664,706
Claims priority, application Great Britain, Oct. 7, 1966, 44,817/66
Int. Cl. F16n 1/00; F04b 9/02
U.S. Cl. 184—18    3 Claims

ABSTRACT OF THE DISCLOSURE

A high pressure cyclic impulse pump lubrication apparatus for an internal combustion engine. A body part having a stem thereon and an inertia mass slidable therein, with a cylinder member attached to said stem, a pump plunger attached to said inertia mass, and a transfer passage and cut off port forming a fluid cushion chamber for said inertia mass.

---

This invention relates to an improved impulse pump and is particularly, though not exclusively, applicable to pumps for the lubrication of reciprocating parts of internal combustion engines by cyclic pressure-intensified impulses.

Even though a pressure lubrication system is normally provided for such engines, there are several circumstances and conditions where such pressure lubrication system is known to be relatively inadequate and where supplementary cyclic pressure-intensified impulse lubrication has been successfully provided to supplement the normal system of pressure lubrication; for example at the gudgeon pin bearing of large 2-stroke cycle diesel engines.

The object of the present invention is to provide an improved construction of high pressure impulse pump, that is to say capable of providing cyclic lubrication impulses having pressures rising to several hundred or even thousands p.s.i. (pounds per square inch) compared with the several tens of p.s.i. of normal pressure lubrication systems.

The present invention is based on the appreciation that with mechanism having relatively large reciprocating parts there is a possibility of incorporating in such parts a pressure-intensified impulse pump actuated by inertia masses instead of by cams, linkages or other mechanical means generally employed to actuate such a pump.

According to the invention a lubrication high pressure impulse pump for a trunk piston of an internal combustion engine comprises a body part adapted to be attached to, or incorporated in, a reciprocating part of the engine, characterised by an inertia mass slidably located in said body part a high pressure plunger pump within the trunk piston having plunger and cylinder parts connected between the said inertia mass and body parts, and fluid cushion means limiting movement of the said inertia mass within the trunk piston.

The pump is mounted within a reciprocating part of the engine and, in operation, lubricatnig oil is supplied from the pressure lubricating system.

The accompanying drawing is a longitudinal section of one example of an impulse pump made in accordance with the present invention.

As shown in the drawing the pump comprises a cup-shaped body part 10 having a screw-threaded or splined stem 11 at its base adapted to be screwed into a complementary hole in the gudgeon pin bearing boss of a large trunk piston (not shown) so as to be located within the crown end of the piston. A cover 12 is provided to close the open top of the body part 10, which latter is fitted with a sealing ring 13 and having a screwed socket 14 for a locking grub screw (not shown). Sockets 15 are provided for a key so that the cap may be tightly screwed in place. In the wall of the body part 10 are air transfer passages 10a communicating with an annular port groove 10b suitably spaced away from the cover 14 so that the inertia mass 25 (described later) entraps a volume of air, to form a fluid air cushion.

Located co-axially in the stem 11 of the body part 10 is a cylinder 16 of a high-pressure plunger pump, engaging a sealing ring 17 and secured in position in such stem by a screwed plug 18 and sealing packing 19. A pair of ducts 20, an annular groove 21 and ports 22 together provide passages for lubricating oil to and from the pump cylinder 16, such oil coming from the normal pressure lubrication system for the gudgeon pin bearing (not shown), through suitable ducts in the latter. The plunger 23 of the high pressure pump has a crowned head 24 and is made captive in known manner, as immediately to be described, in a recess in the centre of an inertia mass 25 slidably located in the body part 10 aforesaid. The fixing means for the head of the pump plunger includes a screwed nut 26 and pads 27 and 28. In the base of the cup-shaped body part 10 aforesaid is a supplementary passage 10c and a packing 10d while separate annular grooves 10e and 10f are also formed in the underside of the base in register with the passages 10c and 10a respectively.

The annular grooves 10e and 10f communicate respectively through the passages 10c and 10a with the interior of the body part 10 but are spaced apart so that there will be a greater possibility of renewal of the gases with each movement of the inertia mass 25, with advantages as regards cooling.

In operation, the inertia mass 25 moves axially within the cup-shaped body part 10 under inertia-generated forces as the body part 10 is reciprocated with the trunk piston to which the body part is secured. In the upward direction, seen from the drawing its movement is cushioned by entrapped gases after the top end of the mass closes the ports 10b while in the downward direction its movement is in part cushioned by the energy absorbed by the pumping action of the plunger 23 with an ultimate hydraulic arrest if the lower end of the plunger closes the ports 22. Such pumping action produces high pressure impulses increasing in magnitude as the trunk piston is decelerated as it approaches the outer end of the engine cylinder, i.e. when bearing pressures from gaseous pressure on the piston are not at their maximum.

Although described above with particular reference to a high pressure impulse pump to intensify the lubrication pressures at the gudgeon pin of a trunk piston, the invention is obviously applicable to cross head impulse lubrication and impulse lubrication of other reciprocating mechanism.

What is claimed is:

1. A lubrication high pressure cyclic impulse pump for an internal combustion engine comprising a body part, a stem on said body part, an inertia mass slidably located in said body part, a high pressure plunger pump having plunger and cylinder parts connected between said inertia mass and said body part, said plunger being attached to said inertia mass and said cylinder being attached to said stem, fluid cushion means limiting movement of said inertia mass within said body part, said body part and said inertia mass being complementary cylinder and piston parts, a transfer passage and cut off port forming said cushion means for said inertia mass in the direction of movement for induction of lubricant into said plunger pump.

2. An impulse pump according to claim 1 further characterized by outlet ports in said cylinder so positioned as to operate as a cut-off to form the cushion means limiting movement of the inertia mass in the direction of delivery from said plunger pump.

3. An impulse pump comprising a cup-shaped body part, a screw threaded stem thereon (adapted to be screwed into a complementary hole in a reciprocating part of an engine), an inertia mass slidably located in said body part in the manner of a piston and a cylinder, a closure for the cup-shaped body part, a plunger attached to the inertia mass and a complementary cylinder attached to the stem of said piston, said plunger and said complementary cylinder together constituting a high pressure lubrication pump, passages in the body part connecting the ends thereof to the interior to provide a fluid cushioning means for said inertia mass, a cut-off port connecting one of said passages to the closure end of the body part, and ducts in the said stem for the induction and return of lubricating oil to and from said high pressure lubrication pump, said ducts being arranged for cut off by the piston at the end of the delivery stroke.

References Cited

UNITED STATES PATENTS

| 878,783 | 2/1908 | Downie | 184—18 |
| 1,574,181 | 2/1926 | Baker | 184—18 |
| 1,579,409 | 4/1926 | Smith | 184—18 X |
| 2,843,221 | 7/1958 | Haring | 184—18 |

FOREIGN PATENTS 422,386  3/1911  France.

JAMES A. WONG, Primary Examiner

U.S. Cl. X.R.

103—208